Aug. 4, 1964

M. J. BERLYN 3,142,994

METHOD OF CANCELLING GYRO DRIFT

Filed Dec. 21, 1961

INVENTOR.
MARTIN J. BERLYN
BY
ATTORNEY

Aug. 4, 1964

M. J. BERLYN

3,142,994

METHOD OF CANCELLING GYRO DRIFT

Filed Dec. 21, 1961

INVENTOR.
MARTIN J. BERLYN
BY
*Raymond A. Paquin*
ATTORNEY.

Aug. 4, 1964   M. J. BERLYN   3,142,994
METHOD OF CANCELLING GYRO DRIFT
Filed Dec. 21, 1961   12 Sheets-Sheet 5

Fig. 8.

INVENTOR.
MARTIN J. BERLYN
BY
Raymond A. Paquin
ATTORNEY.

United States Patent Office 3,142,994
Patented Aug. 4, 1964

3,142,994
METHOD OF CANCELLING GYRO DRIFT
Martin J. Berlyn, 389 Metcalfe Ave.,
Montreal, Quebec, Canada
Filed Dec. 21, 1961, Ser. No. 162,314
11 Claims. (Cl. 74—5.34)

This invention relates to gyroscopic stabilization of single-track vehicles.

The stabilizer according to this invention is for application to single track vehicles which are inherently unstable about the roll axis and in which the athwartship axis is maintained at right angles to the dynamic vertical when the vehicle is changing direction.

This application is a continuation in part of my application Serial No. 155,763, filed November 29, 1961, now abandoned.

Known gyro stabilizers for vehicles of this type consist of a platform with twin contra-rotating single-degree-of-freedom gyros having their tilt axes perpendicular to, and their input axes parallel with, the roll axis.

In operation of such vehicles, normal precession of the gyros may be as much as 45° either side of orthogonal; consequently, it is not possible to tolerate more than a few degrees of tilt for earth's rate correction and/or random drift.

When tilt due to these causes approaches the tolerable limit, therefore, it must be restored by means of a centering motor.

However, application (by the centering motor) of torque about the tilt axes generates torque about the roll axis, so that it is necessary to stabilize the vehicle by external supporting means while the gimbals are being centered. This is a serious, and generally unacceptable, limitation to the usefulness of this type of stabilizer for single-track vehicles.

In a stabilizer comprising two twin gyro platforms, the problem of cancelling drift could not be solved by linking the gimbals of each platform to the gimbals of the other platform so that the drift and earth's rate correction of the two pltaforms would oppose each other, because this linkage would also cause the gyro torques about the roll axis to cancel; and the resultant stabilizing effect on the vehicle would be zero.

If each of the twin gyro platforms were independently capable of stabilizing the vehicle, it would not be practicable to cancel the drift of one platform with a centering motor while the other platform stabilized the vehicle, because the action of centering a platform would generate torque about the roll axis. The centering would have to be carried out very slowly and the vehicle would be uncomfortably out of plumb while the centering motor worked on the drifted platform.

In the stabilizer according to this invention there are two gyro platforms mounted in a common frame. The frame is pivotally mounted on the vehicle deck so that it can rock through a small angle relative to the deck about an axis parallel with the roll axis. A single pickoff, responding to angular displacement of the frame relative to the deck, generates signals which monitor the gyros of both platforms. Each platform (capable of stabilizing the vehicle without assistance from the other) has two contra-rotating single-degree-of-freedom gyros with the input axes normally parallel with the roll axis; but the platforms are pivotally mounted in the frame and provided with slewing motors so that, independently of each other, they can be slewed 90° about an axis at right angles to the roll axis.

In normal operation of this stabilizer, signals from the pickoff monitor two torquers (one for each platform) in parallel; thus, all four gyros are slaved to the dynamic vertical. When a platform needs drift cancellation, its torquer is isolated from the pickoff and its gimbals are locked with respect to their platform; then, the platform is slewed 90° about an axis at right angles to the roll axis, thus placing the gyro input axes at right angles to the roll axis of the vehicle; the gimbals are unlocked and a centering motor cancels the drift. Due to the 90° slewing of the platform about an axis at right angles to the roll axis; drift cancellation generates no torque about the roll axis of the vehicle. Immediately, the drift has been cancelled, the gimbals are again locked (now orthogonal), after which the platform is again slewed through 90°. Finally, but only when the helm of the vehicle is straight, the gimbals are unlocked and the torquer reconnected with the pickoff. Means are provided for prevention of simultaneous isolation of both torquers from the pickoff.

This invention also covers a method of fully automatic drift cancellation which includes a method of distinguishing drift from normal precession. A gyroscopic stabilizer according to this invention is capable of continuous effective functioning without necessity for supporting the vehicle by external means during cancellation of drift, and a vehicle fitted with this stabilizer is unaffected by latitude or orientation.

Referring to the drawings:

FIGS. 1 to 7 inclusive show a vehicle equipped with the stabilizer according to this invention.

FIGS. 8 to 15 inclusive represent an automatic drift-cancelling control system applicable to the drift-cancelling method shown in FIGS. 1, 2, 3 and 4. In schematic format, FIGS. 8 to 15 show successive stages of a drift-cancelling cycle for one platform.

FIG. 5 is an elevation with a partial section on B—B of FIG. 7.

FIG. 9 shows the control system: No drift. Vehicle turning.

Referring more particularly to the drawings wherein similar reference characters designate corresponding parts thoughout:

With reference to FIGS. 1, 5, 6, and 7, the vehicle deck 21 is provided with supports 22 and 23 in which frame 24 is journaled on trunnions 25 and 26. Lever 27 is fixed to trunnion 26 and the movement of the lower end 28 of lever 27 is restricted by abutments 29 and 30 fixed to deck 21.

Within the limits imposed on movement of frame 24 by contact of the lower end 28 of lever 27 against abutments 29 and 30, deviation of frame 24 from its median position is resisted by variable-rate spring 31 which is fixed to deck 21.

Frame 24 carries two platforms 32 and 33. Platform 32 is mounted in frame 24 by two trunnions 34 and 35. Platform 33 is carried on trunnions 36 and 37.

Trunnion 35 is provided with a toothed quadrant 38 which meshes with toothed rack 39 of slewing motor 40. Trunnion 37 is provided with a toothed quadrant 41 which meshes with the toothed rack 42 of slewing motor 43.

Slewing motors 40 and 43 are mounted on frame 24 and are capable of slewing platforms 32 and 33 respectively through 90° about their trunnion axes.

Platform 32 is provided with two contra-rotating single-degree-of-freedom gyros 44 and 45 in gimbals 46 and 47 respectively. Gimbals 46 and 47 are provided with bevel quadrants 48 and 49 respectively which mesh with bevel pinions 50 and 51 respectively mounted on the ends of shaft 52 which is driven by spur pinion 53. Spur pinion 53 is driven by toothed rack 54 of torquer 55.

Platform 33 is provided with two contra-rotating single-degree-of-freedom gyros 56 and 57 in gimbals 58 and 59 respectively. Gimbals 58 and 59 are provided with bevel quadrants meshing with bevel pinions mounted on the ends of shaft 60 which is driven by spur pinion 61. Spur pinion 61 is driven by toothed rack 62 of torquer 63 (see FIG. 7).

The lower end 28 of lever arm 27 is fitted with a crankpin 64 on which is operably mounted one end of connecting rod 65. The other end of connecting rod 65 is operably connected to pilot valve 66 of pickoff 67 which is provided with a supply port 165 (shown only in FIGS. 8–15) connected to a supply of oil under pressure. The vehicle is provided with two wheels 68 and 69. Wheel 69 is steerable by way of helm shaft 70.

With reference to FIGS. 8 to 15 inclusive, slewing motor 40 is provided with pistons 91 and 92 which are connected by a common piston rod 93 which carries toothed rack 39. A valve assembly shown generally at 94 comprises a valve housing 95 and a piston valve 96. Valve housing 95 is provided with a supply port 97 which is fed from a source of oil under pressure. Piston valve 96 is actuated by the armature 98 of solenoid 99 which is provided with windings 100 and 101 which produce magnetic fields of equal strength but of opposite polarity.

Slewing motor 43 is provided with pistons 102 and 103 which are connected by a common piston rod 104 which carries toothed rack 42. A valve assembly shown generally at 105 comprises a valve housing 106 and a piston valve 107. Valve housing 106 is provided with a supply port 108 which is fed from a source of oil under pressure. Piston valve 107 is actuated by the armature 109 of solenoid 110 which is provided with windings 111 and 112 which produce magnetic fields of equal strength but of opposite polarity.

Torquer 55 is provided with pistons 113 and 114 which are connected by a common piston rod 115 which carries toothed racks 54 and 71. Meshing with toothed rack 71 is a toothed sector 72 which is mounted on shaft 73. Torquer 55 is served by a valve assembly shown at 116. Valve assembly 116 comprises valve housing 117, two blocking valves 118 and 119, centering valve 80, and a supply port 120 which is fed from a source of oil under pressure. Centering valve 80 is actuated by link 79 which is connected to one end of rocker 76 which rocks on fulcrum pin 77. The other end of rocker 76 is connected to one end of link 75. The other end of link 75 is connected to lever 74 which is mounted on shaft 73. Blocking valve 118 is actuated by the armature 121 of solenoid 122 which is provided with a winding 123. Blocking valve 119 is acutated by the armatures 124 and 125 of solenoids 126 and 127 respectively. Solenoid 126 is provided with windings 128 and 129 which produce magnetic fields of equal strength but of opposite polarity. Solenoid 127 is provided with a single winding 130.

Torquer 63 is provided with pistons 131 and 132 which are connected by a common piston rod 133 which carries toothed racks 62 and 81. Meshing with toothed rack 81 is a toothed sector 82 which is mounted on shaft 83. Torquer 63 is served by a valve assembly shown generally at 134. Valve assembly 134 comprises valve housing 135, two blocking valves 136 and 137, centering valve 90, and a supply port 138 which is fed from a source of oil under pressure. Centering valve 90 is actuated by link 89 which is connected to one end of rocker 86 which rocks on fulcrum pin 87. The other end of rocker 86 is connected to one end of link 85. The other end of link 85 is connected to lever 84 which is mounted on shaft 83. Blocking valve 136 is actuated by the armature 139 of solenoid 140 which is provided with a winding 141. Blocking valve 137 is actuated by the armatures 142 and 143 of solenoids 144 and 145 respectively. Solenoid 144 is provided with windings 146 and 147 which produce magnetic fields of equal strength but of opposite polarity. Solenoid 145 is provided with a single winding 148.

Helm switch 149 closes only when the helm is in the "straight ahead" position and helm switch 150 opens only when the helm is "straight ahead"; both helm switches 149 and 150 are actuated by helm shaft 70.

Selective electromagnetic switch shown generally at 151 comprises two windings 152 and 153, an amature 154 which is spring-biased to its central position, and two groups of five contacts each shown generally at 155 and 156.

Slewing switches 157 and 158 are actuated by trunnion 35. Switch 157 is only closed when platform 32 is slewed 90° from its normal orientation whereas switch 158 is only open when platform 32 is in its normal orientation.

Slewing switches 159 and 160 are actuated by trunnion 37. Switch 159 is only closed when platform 33 is slewed 90° from its normal orientation whereas switch 160 is only only when platform 33 is in its normal orientation.

Tilt switches 161 and 162 are actuated by the shaft 73 of torquer 55. Switch 161 is only open when the tilt of gimbals 46 and 47 is less than the tolerable drift angle and switch 162 is only closed when gimbals 46 and 47 are orthogonal.

Tilt switches 163 and 164 are actuated by the shaft 83 of torquer 63. Switch 163 is only open when the tilt of gimbals 58 and 59 is less than the tolerable drift angle and switch 164 is only closed when gimbals 58 and 59 are orthogonal.

Figure 1:
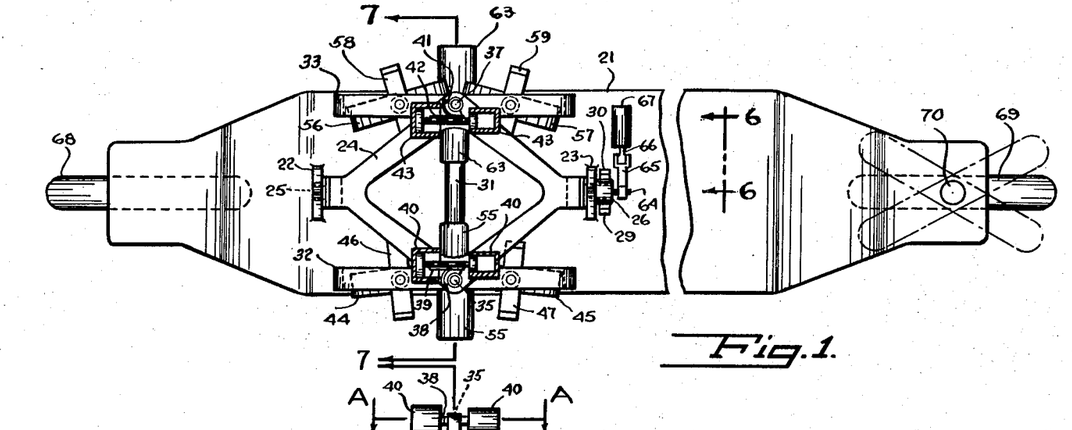
FIG. 1 is a plan view, with a partial section on A—A of FIG. 5. One of the two platforms is shown heavily drifted.

The method of cancelling drift according to this invention may readily be understood by reference to FIGS. 1, 2, 3 and 4. In FIG. 1 the gyros 56 and 57 of platform 33 are shown drifted to the extent that cancellation of the drift is called for.

Figure 2:
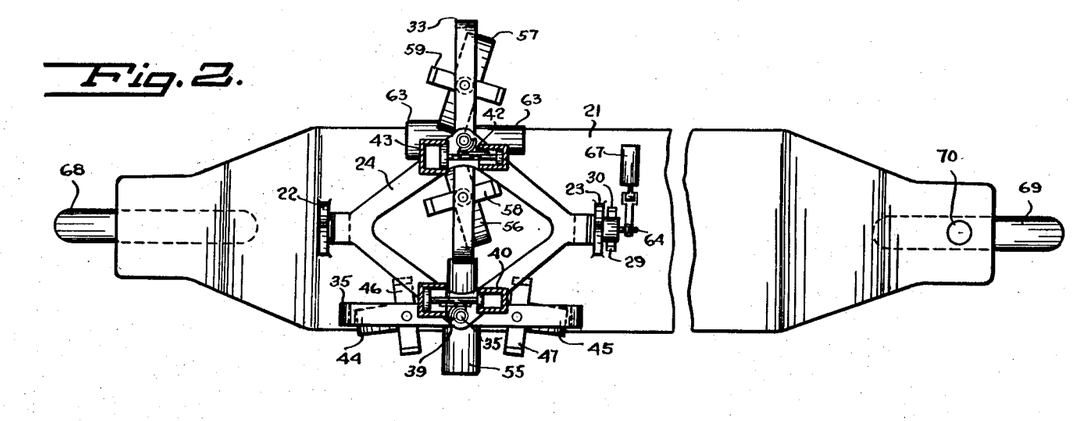
FIG. 2 is a plan view showing the drifted platform slewed 90° from normal.

FIG. 2 shows platform 33 slewed 90° from its normal orientation so that the input axis of this platform has been placed at right angles to the roll axis of the vehicle, whereby precession torque due to drift cancellation does not disturb the roll stability which is being maintained by platform 32.

Figure 3:
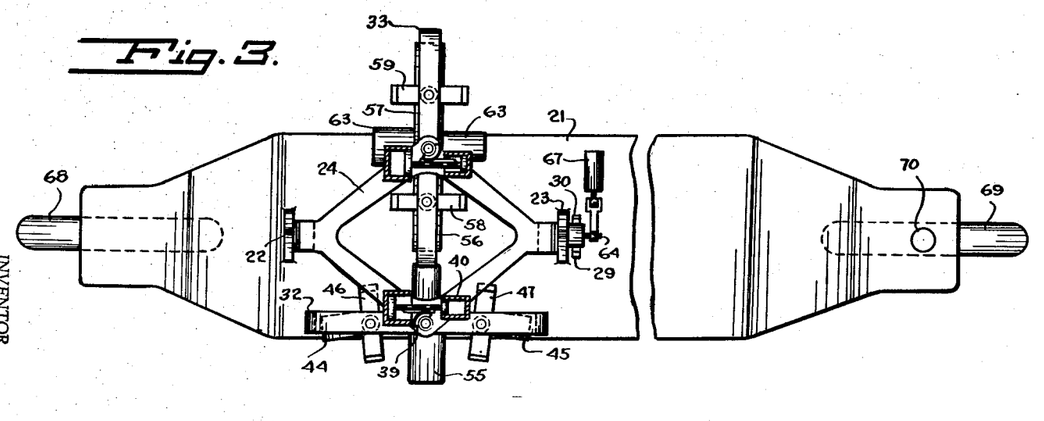
FIG. 3 is a plan view showing the gyros of the drifted platform after cancellation of their drift.

FIG. 3 shows platform 33 still slewed 90° from normal, but with the gyros 56 and 57 now orthogonal.

Figure 4:
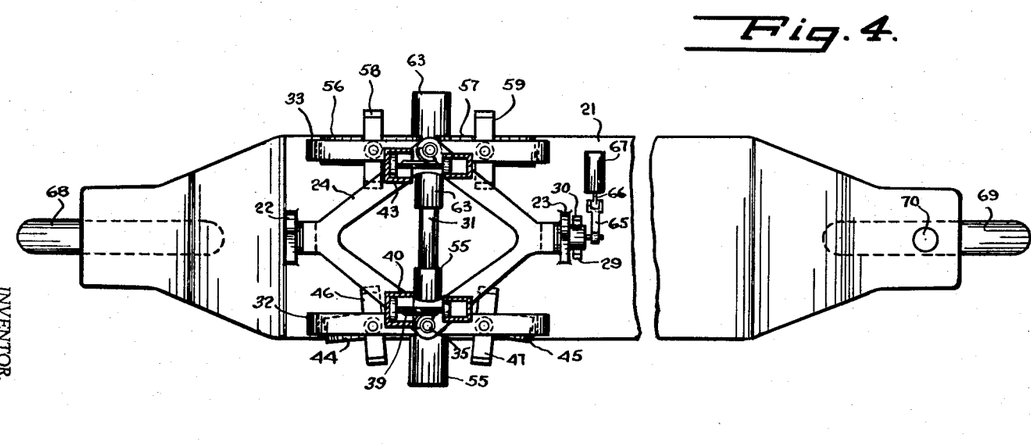
FIG. 4 is a plan view showing the drift-cancelled platform returned to normal orientation.
Figure 6:
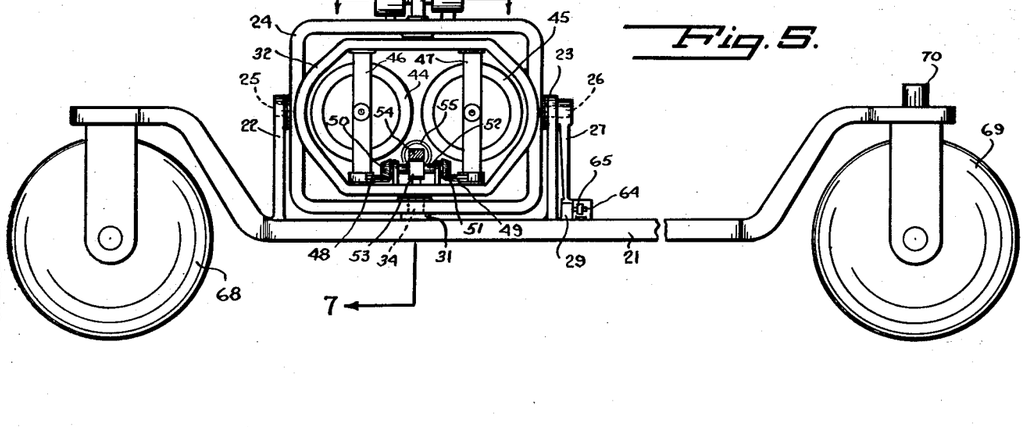
FIG. 6 is a fragmentary view in the direction of arrows 6—6 on FIG. 1.
Figure 7:
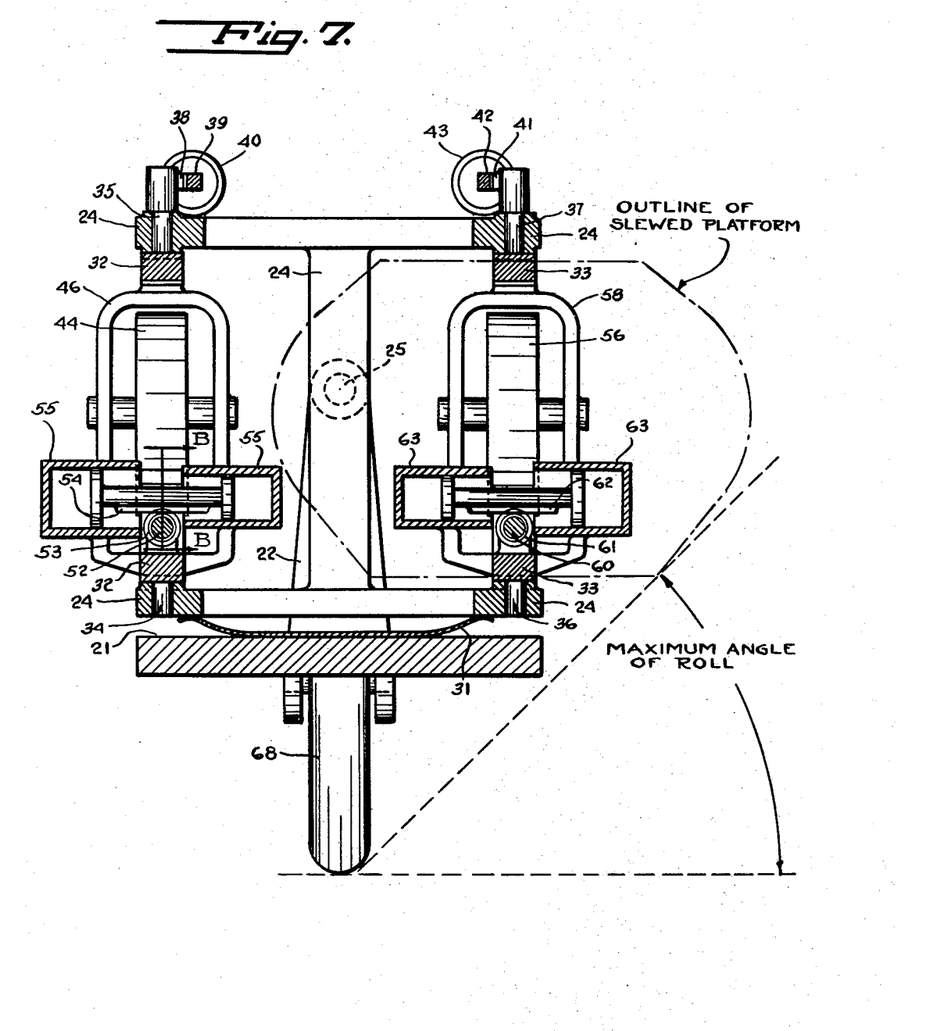
FIG. 7 is a section on 7—7 of FIGS. 1 and 5. The gyros are shown orthogonal.

FIG. 4 shows platform 33 returned to normal orientation, with drift cancelled, and ready to be put back on duty.

The functioning of the electro-hydraulic automatic drift-cancelling control system according to this invention is shown, in FIGS. 8 to 15 inclusive, with the components in combinations of position corresponding with various regimes of operation.

Figure 8:
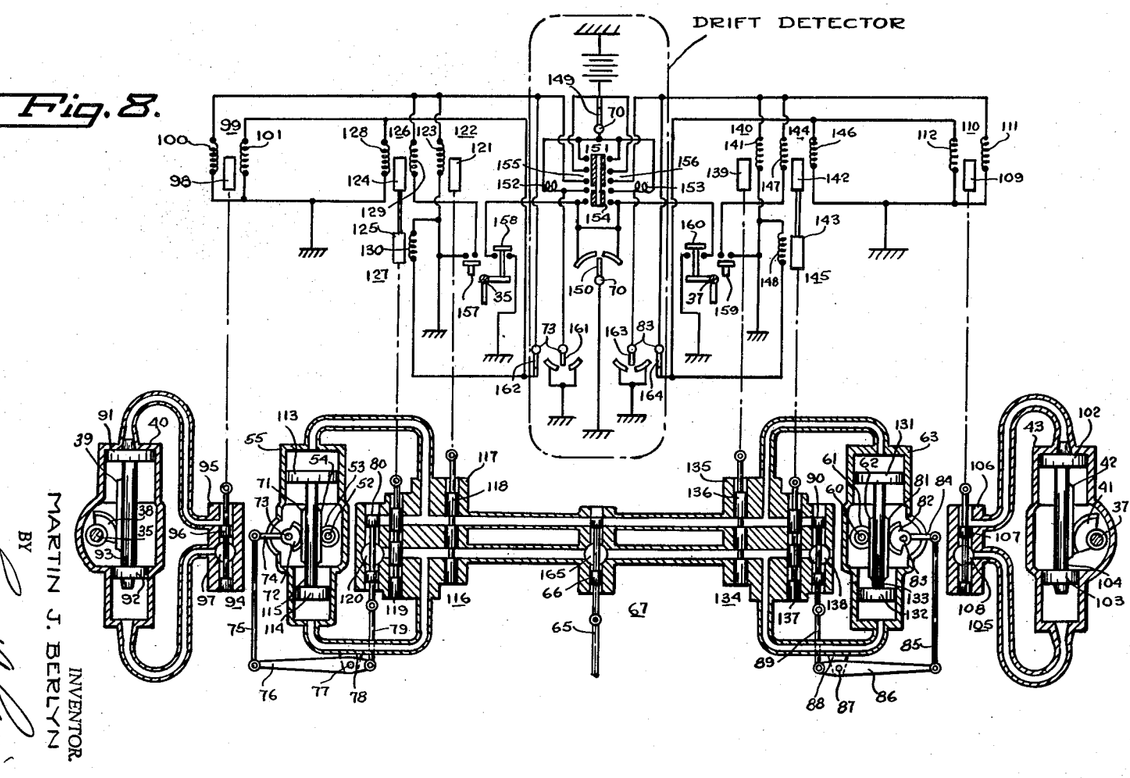
FIG. 8 shows the control system: No drift. Vehicle running straight.

FIG. 8 shows the control system when the gyros are not drifted and the vehicle is running straight. Helm switch 149 is closed, but tilt switches 161 and 163 are open, therefore, there is no circuit through either coil 152 or coil 153 of electro-magnetic switch 151; armature 154 therefore remains in its central position and all contacts 155, 156 are open-circuited. Blocking valves 119 and 137 are closed whereby centering valves 80 and 90 are ineffectual; but blocking valves 118 and 136 are open whereby torquers 55 and 63 are both monitored by pilot valve 66 of pickoff 67 in such manner that platforms 32 and 33 are slaved in parallel to the dynamic vertical of deck 21.

FIG. 9 shows the control system when the gyros are not drifted and the vehicle turning. Tilt switches 161 and 163 are closed, but helm switch 149 is open, therefore, there is no circuit through either coil 152 or coil 153 of electromagnetic switch 151; armature 154 therefore remains central and all electric circuits are dead. Pilot valve 66 of pickoff 67 is still monitoring both platforms 32 and 33.

Figure 10:
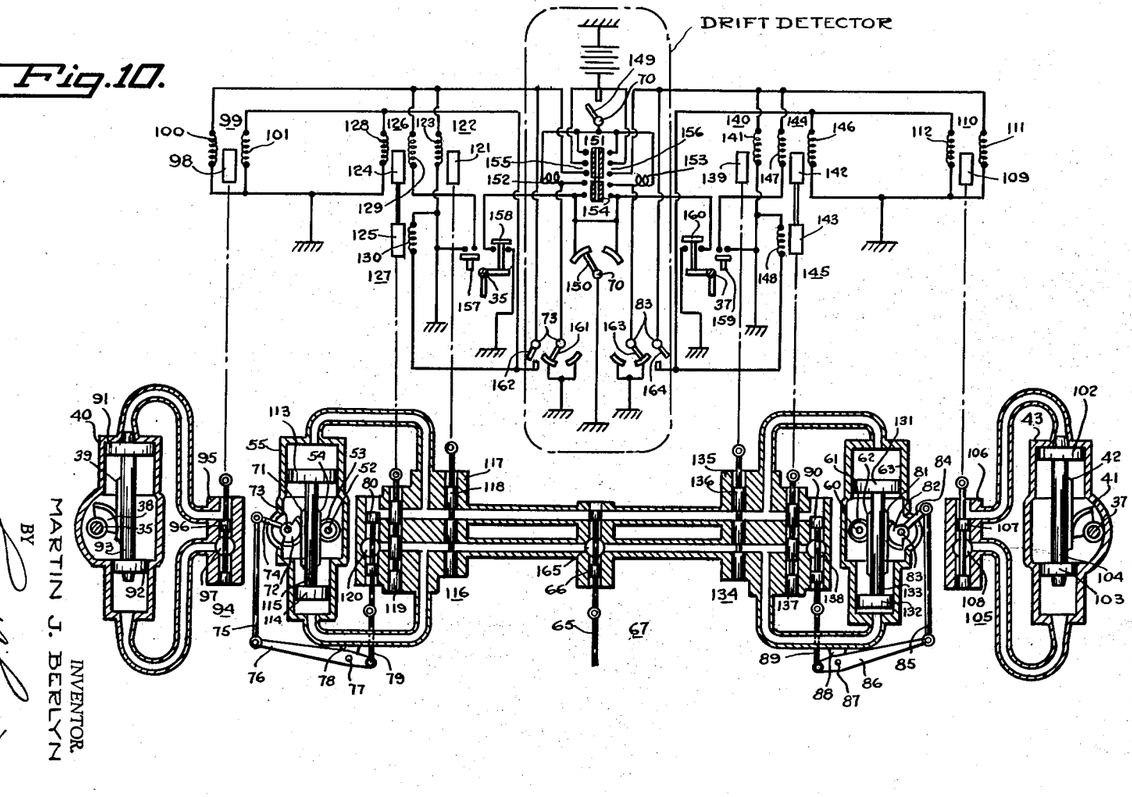
FIG. 10 shows the control system: One platform drifted. Vehicle turning.

FIG. 10 shows the control system when gyros 56 and 57 of platform 33 are drifted but with the vehicle turning. Tilt switches 161 and 163 are closed but helm switch 149 is open: all electric circuits are dead. Pilot valve 66 is still monitoring both platforms 32 and 33.

Figure 11:
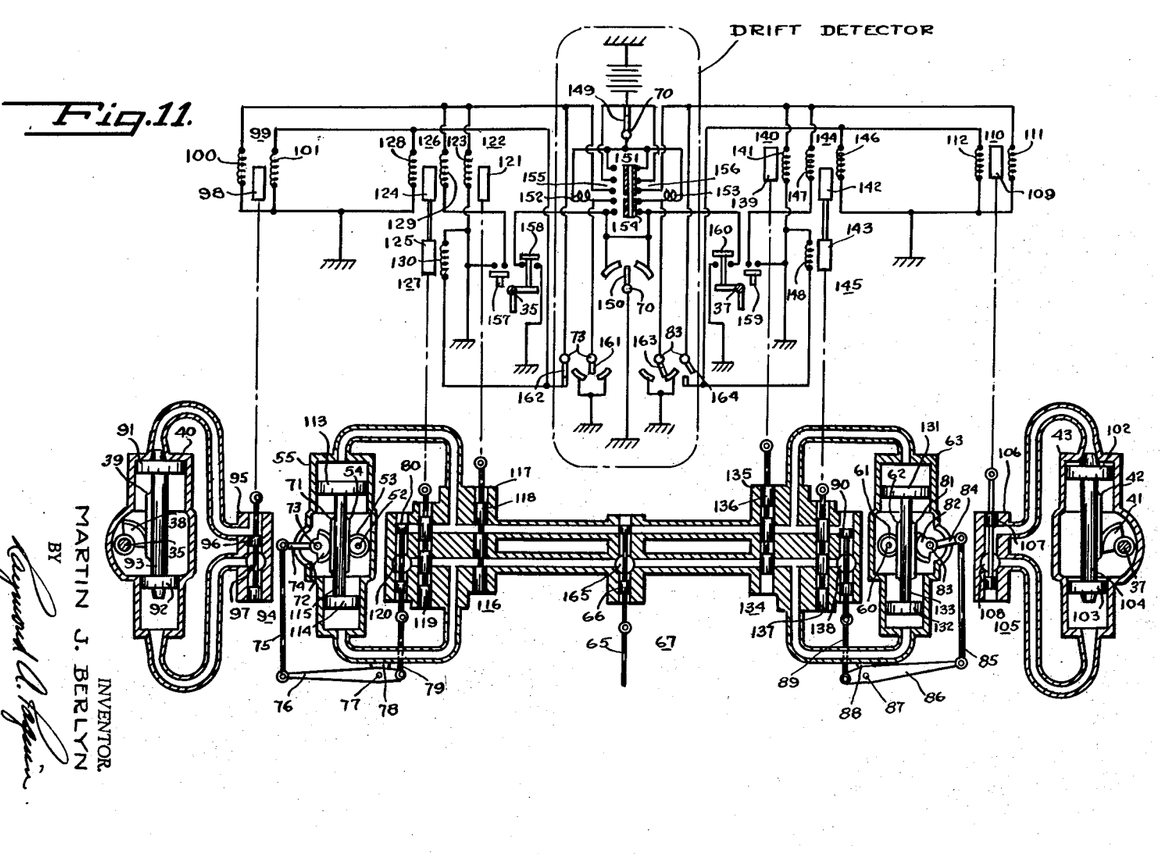
FIG. 11 shows the control system: One platform drifted. Vehicle running straight.

FIG. 11 shows the control system when gyros 56 and 57 of platform 33 are drifted and with the vehicle running straight. Both helm switch 149 and tilt switch 163 are closed. Coil 153 of electromagnetic switch 151 is energized and armature 154 has moved toward coil 153 closing circuits of contacts 156. Helm switch 149 is now short-circuited by electromagnetic switch 151 so that the circuit through coil 153 will not be broken if helm switch 149 opens again (as well it may immediately after closing). Closing of electromagnetic switch 151 in the direction of coil 153 not only short-circuited helm switch 149 but also closed circuits energizing coils 141 and 111 of solenoids 140 and 110 respectively, whereby blocking valve 136 and slewing valve 107 have been lifted. Torquer 63 has been hydraulically locked (which automatically locked tilt switch 163 in closed position) and slewing motor 43 applies a slewing moment to platform 33 by way of quadrant 41 and trunnion 37.

It should be noted that with torquer 63 isolated from pickoff 67 by the lifting of blocking valve 136, platform 32 assumes sole charge of the stabilization of the vehicle.

Figure 12:
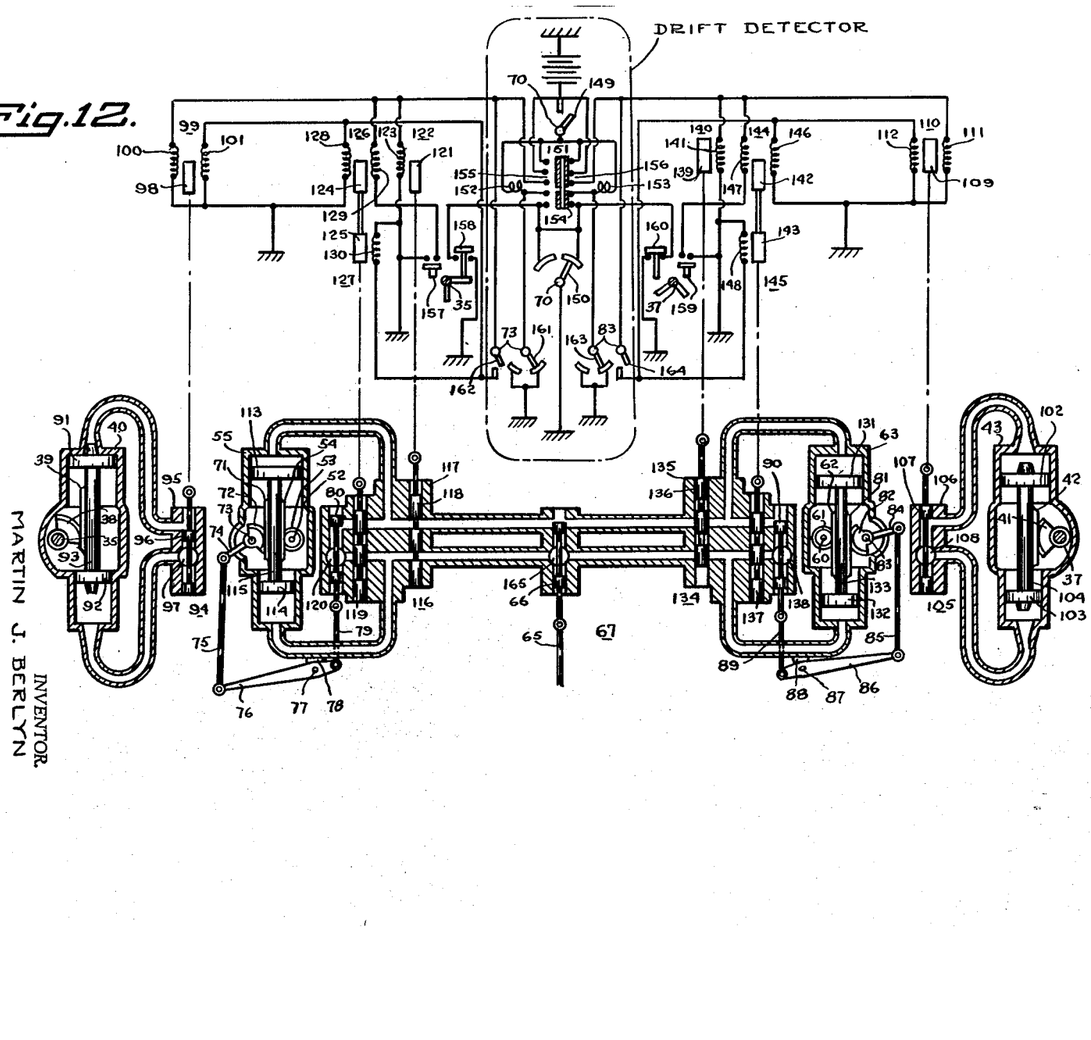
FIG. 12 shows the control system: One platform (drifted) slewing. Vehicle turning.

FIG. 12 shows the control system when platform 33, with gimbals 58 and 59 locked as drifted, is being slewed. The pistons 102 and 103 of slewing motor 43 have moved to the mid-point of their stroke. Quadrant 41 and trunnion 37 have turned through 45°; slewing switch 160 has closed. The vehicle is now making a turn; helm switch 149 is open; but the circuit through winding 153 of electromagnetic switch 151 is completed by armature 154 of electromagnetic switch 151 and by tilt switch 163 actuated by shaft 83 of torquer 63 which is hydraulically locked by blocking valves 136 and 137. By the closing of slewing switch 160 the circuit through winding 153 is made independent of the position of tilt switch 163.

Figure 13:
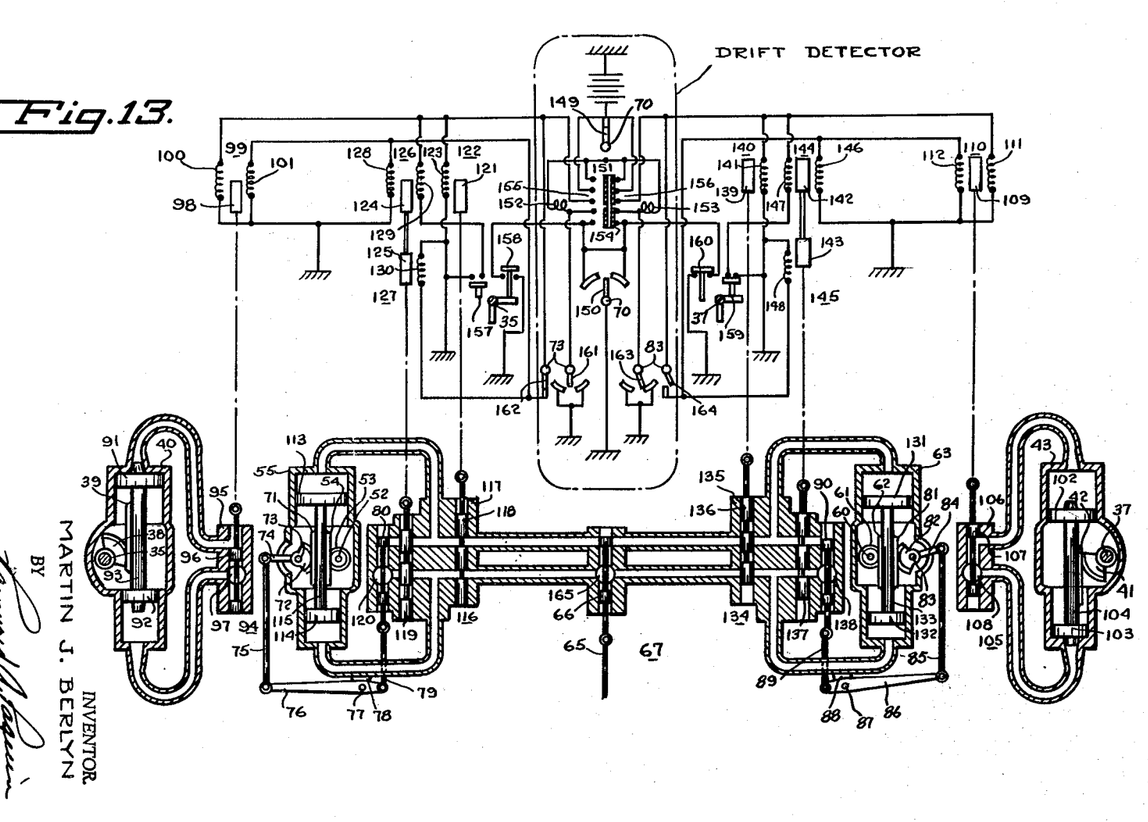
FIG. 13 shows the control system: Drifted platform slewed. Gyros centering. Vehicle running straight.

FIG. 13 shows the control system after the platform 33 has slewed through 90°. Pistons 102 and 103 of slewing motor 43 have completed their stroke. Quadrant 41 and trunnion 37 have turned through 90°. Slewing switch 159 has closed, thereby completing the circuit through winding 147 of solenoid 144 so that armature 142 has lifted blocking valve 137. Oil under pressure from supply port 138 now urges the pistons 131 and 132 or torquer 63 towards their central position. Centering valve 90 is likewise moved towards its closed position. The linkage connecting centering valve 90 with pistons 131 and 132 is so dimensioned that centering valve 90 is closed only when the pistons are in their mid-stroke position (corresponding with the orthogonal position of gimbals 58 and 59 of platform 33). If pistons 131 and 132 are not in their midstroke position, the displacement of centering valve 90 is such as to shift them to this position when blocking valve 137 is lifted. It is to be noted that blocking valve 136 is always lifted before blocking valve 137 is lifted, and that it is not dropped until after blocking valve 137 has been dropped.

Figure 14:
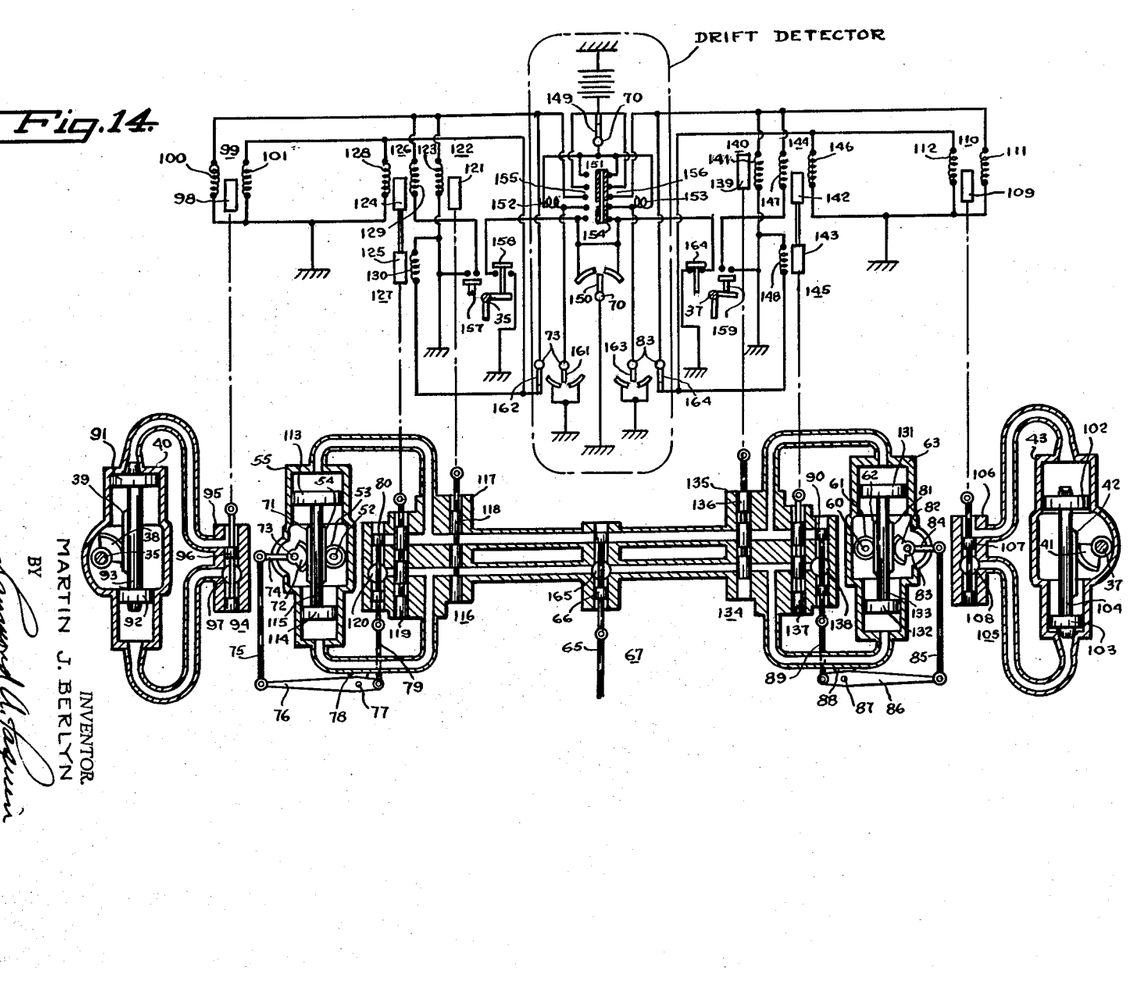
FIG. 14 shows the control system: Gyros centered. Platform returning to normal orientation. Vehicle running straight.

FIG. 14 shows the control system after gimbals 58 and 59 of platform 33 have been turned to the orthogonal position. Centering valve 90 has closed. Pistons 131 and 132 of torquer 63 have come to rest in their mid-stroke position. Tilt switch 163 has opened, but the circuit through winding 153 of electromagnetic switch 151 is still complete because slewing switch 160 is closed. Tilt switch 164 has closed; this completes the circuit through winding 146 of solenoid 144 neutralizing the magnetic flux due to winding 147 and permitting armatures 142 and 143 to drop, whereby blocking valve 137 is dropped, hydraulically locking torquer 63, which is to say that gyros 56 and 57 of platform 33 are now caged in the orthogonal position. The closing of tilt switch 164 has also completed the circuits through windings 148 and 112 of solenoids 145 and 110 respectively. The magnetic flux due to winding 112 of solenoid 110 neutralizes the flux due to winding 111 whereby armature 109 drops thus dropping slewing valve 107 so that oil under pressure from supply port 108 causes pistons 102 and 103 of slewing motor 43 to apply a slewing moment about trunnion 37 by way of quadrant 41.

Slewing of platform 33 back to its normal orientation has commenced and slewing switch 159 has opened, de-energizing winding 147 of solenoid 144. The magnetic flux due to winding 146 of solenoid 144 acting on armature 142 does not, however, lift blocking valve 137 because of the greater force exerted on armature 143 of solenoid 145 due to the current in winding 148. Torquer 63 therefore remains hydraulically locked.

Figure 15:
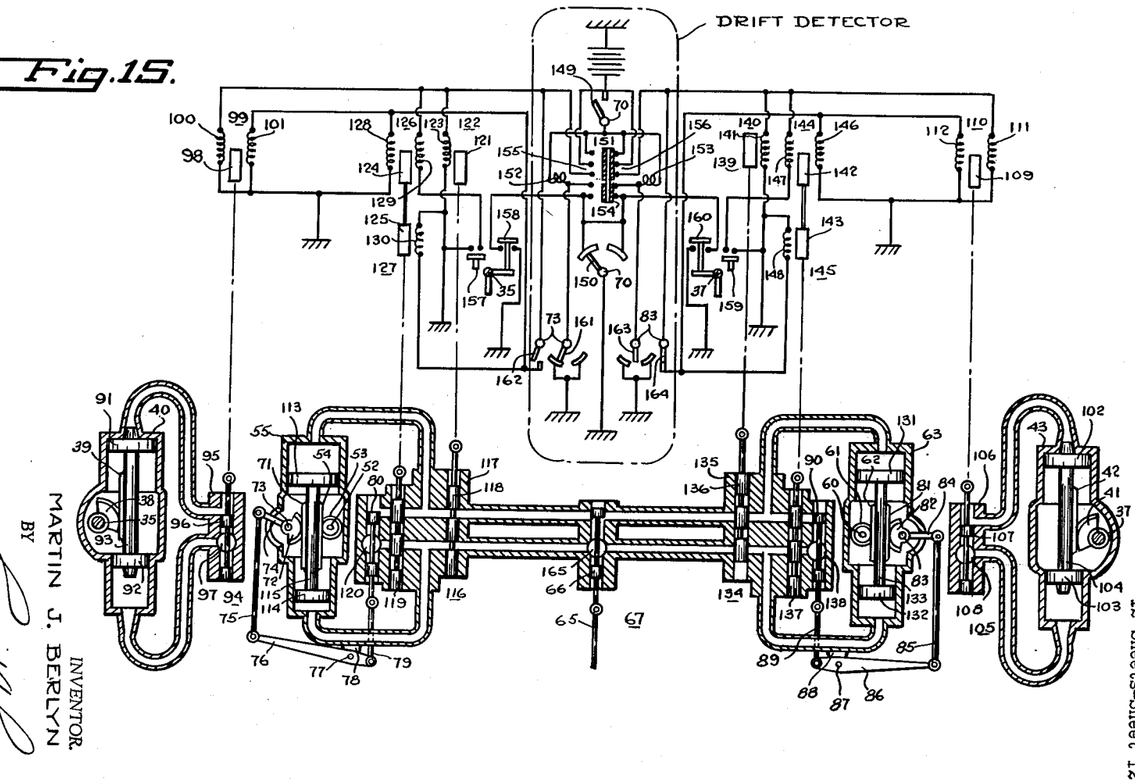
FIG. 15 shows the control system: Gyros centered. Platform normally oriented. Vehicle turning.

FIG. 15 shows the control system with reversed slewing completed, platform 33 returned to its normal orientation and the vehicle running in a curved path. Slewing switch 160 is now open, but the ground circuit of winding 153 of electromagnetic switch 151 is still complete, due to the fact that helm switch 150 is closed. Therefore winding 141 of solenoid 140 is still energized and blocking valve 136 of torquer 63 is still lifted and torquer 63 is still hydraulically locked. The vehicle's stability is still being maintained by platform 32.

FIG. 8 shows the control system now with the vehicle running straight. Helm switch 150 has now opened and, since tilt switch 163 and slewing switch 160 were already open, winding 153 of electromagnetic switch 151 is de-energized. Armature 154 moves away from contacts 156 and windings 141, 146, 148, 111 and 112 are all simultaneously deenergized.

Deenergization of winding 141 of solenoid 140 causes armature 139 and blocking valve 136 to drop, whereby torquer 63 is again monitored by pickoff 67.

Deenergization of windings 146 and 148 removes the magnetic forces from armatures 142 and 143 respectively and leaves blocking valve 137 as it was, in its lowered position, whereby centering valve 90 is maintained ineffective.

Simultaneous deenergization of windings 111 and 112 of solenoid 110 simply leaves slewing valve 107 where it was, in its lowered position.

The operation of the device is believed apparent from the foregoing description taken in connection with the accompanying drawings wherein a preferred form of the invention has been shown by way of illustration only.

As shown in FIGS. 1, 2, 3, 4, 5 and 7, the gyro platforms 32 and 33 are trunnioned in frame 24 for slewing through 90° about their yaw axes, but they could alternatively be trunnioned in frame 24 for slewing through 90° about their pitch axes; this would be equally effective in the prevention of torque about the roll axis during correction of drift by the torquers.

From the above it will be seen that I have provided new and improved means and method for obtaining all of the objects and advantages of the invention.

I claim:

1. A stabilizer for a single track vehicle comprising two gyro platforms, frame means for said platforms, said frame means being pivotally mounted relative to the vehicle deck so that it can rock through a small angle relative to the deck about an axis parallel with the roll axis, means resisting pivotal movement of said frame, a single pickoff responding to angular displacement of said frame means relative to said deck, said pickoff generating signals which normally monitor the gyros of both platforms, each platform being capable of stabilizing the vehicle without assistance from the other, each platform having two contra rotating single degree of freedom gyros with input axes normally parallel with the roll axis of the vehicle, both platforms being pivotally mounted in said frame means, a slewing motor for each platform and capable of slewing it through an angle of substantially 90 degrees about an axis at right angle to the roll axis.

2. A stabilizer for a single track vehicle comprising two gyro platforms, common frame means for said platforms, said frame means being pivotally mounted relative to the vehicle deck so that it can rock through a small angle relative to the deck about an axis parallel with the roll axis, means resisting pivotal movement of said frame, a single pickoff responding to angular displacement of said frame means relative to said deck, said pickoff generating signals which normally monitor the gyros of both platforms, each platform being capable of stabilizing the vehicle without assistance from the other, each platform having two contra rotating single degree of freedom gyros with input axes normally parallel with the roll axis of the vehicle, both platforms being pivotally mounted in said frame means, a slewing motor for each platform and capable of slewing it through an angle of substantially 90 degrees about an axis at right angles to the roll axis.

3. A stabilizer for a single track vehicle comprising two gyro platforms, common frame means for said platforms, said frame means being pivotally mounted on the vehicle deck so that it can rock through a small angle relative to the deck about an axis parallel with the roll axis, means resisting pivotal movement of said frame, a single pickoff responding to angular displacement of said frame means on said deck, said pickoff generating signals which normally monitor the gyros of both platforms, each platform being capable of stabilizing the vehicle without assistance from the other, each platform having two contra rotating single degree of freedom gyros with input axes normally parallel with the roll axis of the vehicle, both platforms being pivotally mounted in said frame means, a slewing motor for each platform and capable of slewing it through an angle of substantially 90 degrees about an axis at right angles to the roll axis.

4. A stabilizer for a single track vehicle comprising two gyro platforms, common frame means for said platforms, said frame means being pivotally mounted on the vehicle deck so that it can rock through a small angle relative to the deck about an axis parallel with the roll axis, means resisting pivotal movement of said frame, a single pickoff responding to angular displacement of said frame means on said deck, said pickoff generating signals which normally monitor the gyros of both platforms, each platform being capable of stabilizing the vehicle without assistance from the other, each platform having two contra rotating single degree of freedom gyros with input axes normally parallel with the roll axis of the vehicle, both platforms being pivotally mounted in said frame means, a slewing motor for each platform and capable of slewing it through an angle of substantially 90 degrees about an axis at right angles to the roll axis.

5. A stabilizer for a single track vehicle comprising two gyro platforms, frame means for said platforms, said frame means being pivotally mounted relative to the vehicle deck so that it can rock through a small angle relative to the deck about an axis parallel with the roll axis, means resisting pivotal movement of said frame, a single pickoff responding to angular displacement of said frame means relative to said deck, said pickoff generating signals which normally monitor the gyros of both platforms, each platform being capable of stabilizing the vehicle without assistance from the other, each platform having two contra rotating single degree of freedom gyros with input axes normally parallel with the roll axis of the vehicle, both platforms being pivotally mounted in said frame means, a slewing motor for each platform and capable of slewing it through an angle of substantially 90 degrees about an axis at right angles to the roll axis, said pickoff comprising a piston valve having spaced lands, and a housing having an inlet port and a pair of control port means, one of said control port means cooperating with one of said spaced lands.

6. A stabilizer for a single track vehicle comprising two gyro platforms, frame means for said platforms, said frame means being pivotally mounted relative to the vehicle deck so that it can rock through a small angle relative to the deck about an axis parallel with the roll axis, means resisting pivotal movement of said frame, a single pickoff responding to angular displacement of said frame means relative to said deck, said pickoff generating signals which normally monitor the gyros of both platforms, each platform being capable of stabilizing the vehicle without assistance from the other, each platform having two contra rotating single degree of freedom gyros with input axes normally parallel with the roll axis of the vehicle, both platforms being pivotally mounted in said frame means, a slewing motor for each platform and capable of slewing it through an angle of substantially 90 degrees about an axis at right angles to the roll axis, said pickoff comprising a piston valve having spaced lands, and a housing having an inlet port and a pair of control port means, one of said control port means cooperating with one of said spaced lands, said pickoff being actuated by angular movement of said frame relative to said deck.

7. A stabilizer for a single track vehicle comprising two gyro platforms, frame means for said platforms, said frame means being pivotally mounted relative to the vehicle deck so that it can rock through a small angle relative to the deck about an axis parallel with the roll axis, means resisting pivotal movement of said frame, a single pickoff responding to angular displacement of said frame means relative to said deck, said pickoff generating signals which normally monitor the gyros of both platforms, each platform being capable of stabilizing the vehicle without assistance from the other, each platform having two contra rotating single degree of freedom gyros with input axes normally parallel with the roll axis of the vehicle, both platforms being pivotally mounted in said frame means, a slewing motor for each platform and capable of slewing it through an angle of substantially 90 degrees about an axis at right angles to the roll axis, said slewing motors being connected to said frame and being hydraulically actuated in response to movements of an automatically operated control valve.

8. A stabilizer for a single track vehicle comprising two gyro platforms, frame means for said platforms, said frame means being pivotally mounted relative to the vehicle deck so that it can rock through a small angle relative to the deck about an axis parallel with the roll axis, means resisting pivotal movement of said frame, a single pickoff responding to angular displacement of said frame means relative to said deck, said pickoff generating signals which normally monitor the gyros of both platforms, each platform being capable of stabilizing the vehicle without assistance from the other, each platform having two contra rotating single degree of freedom gyros with input axes normally parallel with the roll axis of the vehicle, both platforms being pivotally mounted in said frame means, a slewing motor for each platform and capable of slewing it through an angle of substantially 90 degrees about an axis at right angles to the roll axis, and a drift detector comprising a helm switch which closes only with the helm in null position and two tilt switches, one for each gyro platform, which switches close only when the gyros of their related platform are tilted to the threshold of the tolerable limit of drift.

9. A stabilizer for a single track vehicle comprising two gyro platforms, frame means for said platforms, said frame means being pivotally mounted relative to the vehicle deck so that it can rock through a small angle relative to the deck about an axis parallel with the roll axis, means resisting pivotal movement of said frame, a single pickoff responding to angular displacement of said frame means relative to said deck, said pickoff generating signals which normally monitor the gyros of both platforms, each platform being capable of stabilizing the vehicle without assistance from the other, each platform having two contra rotating single degree of freedom gyros with input axes normally parallel with the roll axis of the vehicle, both platforms being pivotally mounted in said frame means, a slewing motor for each platform and capable of slewing it through an angle of substantially 90 degrees about an axis at right angles to the roll axis, said pickoff comprising a piston valve having spaced lands, and a housing having an inlet port and a pair of control port means, one of said control port means cooperating with one of said spaced lands, and a drift detector comprising a helm switch which closes only with the helm in null position and two tilt switches, one for each gyro platform, which switches close only when the gyros of their related platform are tilted to the threshold of the tolerable limit of drift.

10. A stabilizer for a single track vehicle comprising two gyro platforms, frame means for said platforms, said frame means being pivotally mounted relative to the vehicle deck so that it can rock through a small angle relative to the deck about an axis parallel with the roll axis, means resisting pivotal movement of said frame, a single pickoff responding to angular displacement of said frame means relative to said deck, said pickoff generating signals which normally monitor the gyros of both platforms, each platform being capable of stabilizing the vehicle without assistance from the other, each platform having two contra rotating single degree of freedom gyros with input axes normally parallel with the roll axis of the vehicle, both platforms being pivotally mounted in said frame means, a slewing motor for each platform and capable of slewing it through an angle of substantially 90 degrees about an axis at right angles to the roll axis, said pickoff comprising a piston valve having spaced lands, and a housing having an inlet port and a pair of control port means, one of said control port means cooperating with one of said spaced lands, said pickoff being actuated by angular movement of said frame relative to said deck, and a drift detector comprising a helm switch which closes only with the helm in null position and two tilt switches, one for each gyro platform, which switches close only when the gyros of their related platform are tilted to the threshold of the tolerable limit of drift.

11. A stabilizer for a single track vehicle comprising two gyro platforms, frame means for said platforms, said frame means being pivotally mounted relative to the vehicle deck so that it can rock through a small angle relative to the deck about an axis parallel with the roll axis, means resisting pivotal movement of said frame, a single pickoff responding to angular displacement of said frame means relative to said deck, said pickoff generating signals which normally monitor the gyros of both platforms, each platform being capable of stabilizing the vehicle without assistance from the other, each platform having two contra rotating single degree of freedom gyros with input axes normally parallel with the roll axis of the vehicle, both platforms being pivotally mounted in said frame means, a slewing motor for each platform and capable of slewing it through an angle of substantially 90 degrees about an axis at right angles to the roll axis, said slewing motors being connected to said frame and being hydraulically actuated in response to movements of an automatically operated control valve, and a drift detector comprising a helm switch which closes only with the helm in null position and two tilt switches, one for each gyro platform, which switches close only when the gyros of their related platform are tilted to the threshold of the tolerable limit of drift.

References Cited in the file of this patent
UNITED STATES PATENTS

| | | |
|---|---|---|
| 1,558,514 | Sperry | Oct. 27, 1925 |
| 1,947,562 | Marmonier | Feb. 20, 1934 |
| 2,758,478 | Fieux | Aug. 14, 1956 |